Nov. 21, 1944.   J. L. ANDERSON   2,363,036
TORCH SUPPORT
Filed Oct. 28, 1941   2 Sheets-Sheet 1

INVENTOR
JAMES L. ANDERSON
BY *J. F. Brandenburg*
ATTORNEY

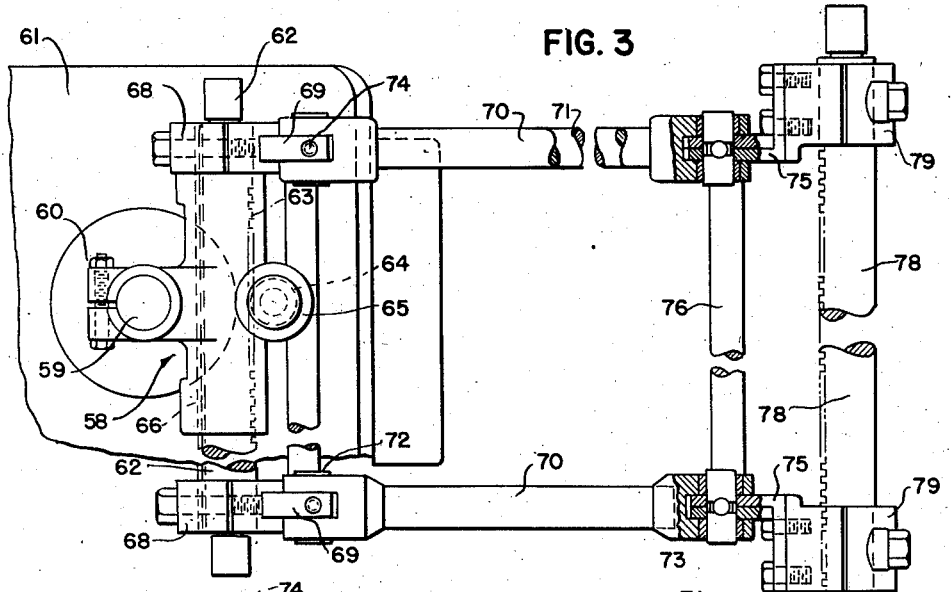

Patented Nov. 21, 1944

2,363,036

UNITED STATES PATENT OFFICE 2,363,036

TORCH SUPPORT

James L. Anderson, Closter, N. J., assignor to Air Reduction Company, Incorporated, New York, N. Y., a corporation of New York Application October 28, 1941, Serial No. 416,852

2 Claims. (Cl. 266—23)

This invention relates to apparatus for supporting one or more torches, especially cutting torches, as they are moved across a work piece. The invention is especially concerned with the support of torches for edge preparation work in which bevel cuts, often multiple-bevel, are made to obtain an advantageous edge form for welding.

Unevenness in the level of the work piece will cause changes in the vertical distance from the torch tip to the surface of the work piece with many types of cutting apparatus. When making bevel cuts, such a variation in the spacing of the tip from the work shifts the plane of the cut, and gives the cut edge a different conformation. For example, in cutting an edge to have a bevel surface and a land, a shift in the plane of cut will either increase or decrease the height of the land.

In addition to spacing of the tip and work piece, the angle of the tip to the work piece must be kept uniform. Although a single tip can move within a limited angle in the plane of its cut without objectionable results, a torch assembly for double bevel cutting cannot move about any axis without changing the shape of the edge.

It is an object of this invention to provide an improved torch support that moves one or more torches up and down in accordance with variations in the level of the work piece and at the same time prevents any angular movement of the torches. A more specific object of the invention is to provide improved apparatus for cutting double bevels when shaping plate edges for welding.

This invention is equally applicable to universal cutting machines and to straight-line cutting machines such as a self-propelled carriage that runs on a track or on the work surface. The invention comprises a frame, preferably a folding parallelogram frame that supports a torch from the work and for floating movement without changing the angular relation of the torch with respect to the surface of the work piece.

Other features of the invention relate to an improved construction for raising the torch from the work and holding the torch and its support in an elevated position, and to novel combinations of elements that make the apparatus simple, economical to manufacture, and efficient and convenient in use.

Other objects, features, and advantages of the invention will appear or be pointed out as the specification proceeds.

In the accompanying drawings, forming part hereof:

Fig. 3 is an enlarged top plan view of a modified form of the invention.

Fig. 4 is a side elevation of the structure shown in Fig. 3.

Fig. 5 is a detail view showing a modification of the raising and lowering structure of Figs. 1 and 2.

Figure 1:
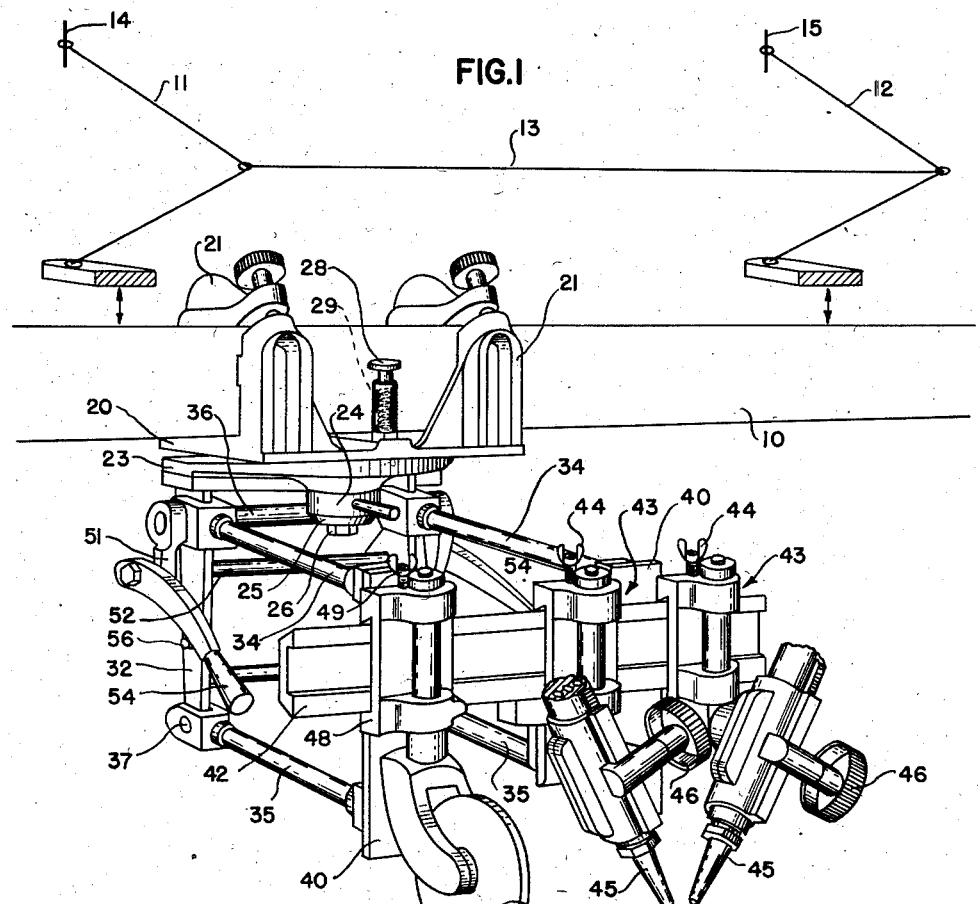
Fig. 1 is a perspective view, partly diagrammatic, showing a universal cutting machine equipped with torch-supporting apparatus embodying this invention.

In Fig. 1 a universal cutting machine is shown diagrammatically. This machine comprises a folding parallelogram frame having a front bar 10 pivotally connected to the forward end of jointed arms 11 and 12, and a connecting link 13 between the joints of the arms 11 and 12. The rearward ends of the jointed arms 11, 12 are supported from spaced posts 14 and 15, which may be on a stationary frame or on a carriage. The front bar 10 is movable parallel to itself in any and changing directions in a plane, and it is moved by a follower device, such as a template-follower, which may be connected to the front bar 10 at any point along the length of the bar since all points of the bar move along courses of the same shape. No illustration of the template-follower is necessary, such devices being well known in the art.

A plate 20 is secured to the front bar 10 by clamps 21. A stud 22 (Fig. 2) extends downward from the plate 20. A bracket 23 fits over the stud 22 and is held on the stud by a clamping nut 24 that threads on the lower end of the stud. The clamping nut 24 is turned to clamp the bracket 23 against the plate 20, or in the opposite direction to release the bracket so that it is free to turn on the stud 22 as a bearing. A collar 25 is secured to the lower end of the stud 22 by a screw 26 and prevents removal of the clamping nut 24 from the stud 22.

The bracket 23 has angularly spaced openings 27 into which a pin 28 is inserted to hold the bracket at selected angular positions. The pin 28 slides in a bearing secured to the plate 20 and is urged downward by a spring 29.

For straight-line cutting the bar 10 is ordinarily moved in the direction of its length or at right angles to its length. In such cases the bracket 23 is preferably locked against turning with respect to the plate 20, but for cuts along irregular lines the bracket is left free to rotate so that the torch-supporting means trails behind the stud 22 like a caster.

A fixed, rearward link 32 is secured at its upper end to the bracket 23 by screws 33. An upper link 34 and a lower link 35 each has a yoke end that fits over the link 32 and is pivotally connected to the link 32. The upper link 34 is connected to the fixed link 32 by a shaft 36; the lower link 35 by a clevis pin 37.

A forward link 40 is connected to yokes at the front ends of the links 34, 35 by clevis pins 37. The links 32, 34, 35 and 40 comprise a folding parallelogram frame which is deflected up and down to raise and lower the forward link 40. There are two of these folding parallelogram frames, as shown in Fig. 1, and their corresponding parts are indicated by the same reference characters.

The forward links 40 are connected by a cross member 42 that serves as a transverse support for one or more torch holders 43 having gibbed slides adjustable along the transverse support 42. The torch holders 43 can be clamped in any set position on the support 42 by tightening up the screws 44. In the drawings, two torches 45 are shown disposed in angular relation to one another for cutting a plate edge with a double bevel. The torches are moved toward and from the work piece by rack and pinion mechanism actuated by knobs 46. No further description of the torch holders is necessary for a complete understanding of this invention.

The forward ends of the folding parallelogram frames are supported from the surface of the work piece by a caster wheel 47 that runs on the work piece and that is connected with the transverse support 42 by a gibbed slide 48. This slide can be clamped to the support member 42 by a clamping screw 49.

Since the rearward links 32 are always held vertical by the bracket 23, the forward links 40 remain vertical and move up and down parallel to themselves to shift the torches 45 up and down without changing the angular relation of the torches with respect to the work piece or to each other. When cutting a plate that is not absolutely flat, the wheel 47 moves up and down the undulations of the plate and compensates for the unevenness of the plate by shifting the torches up and down so that they follow the edge in spite of the undulations of the plate.

In order that the wheel 47 may cause the floating movement of the torches to correspond with unevenness at the part of the plate on which the torches are operating, it is desirable that the wheel 47 be in line with the torches transversely of the work piece, and that it be spaced not too far away from the part of the work piece against which the cutting jets are impinging. The yokes at the rearward ends of the upper links 34 are pinned to the shaft 36 so that they move as a unit with this shaft and with each other. A crank 51 is pinned to each end of the shaft 36 and extends downward along the link 32. A counter-shaft 52 extends through bearings 53 (Fig. 2) on the back of the rearward links 32, and there is a handle 54 secured to each end of the shaft 52. An abutment 55, which may be a roller, extends inward from each of the handles 54. As the handles 54 move counter-clockwise, the abutment 55 moves the crank 51 clockwise and raises the parallelogram frame and transverse support 42 to lift the torches 45 (Fig. 1) and wheel 47 away from the work.

Figure 2:
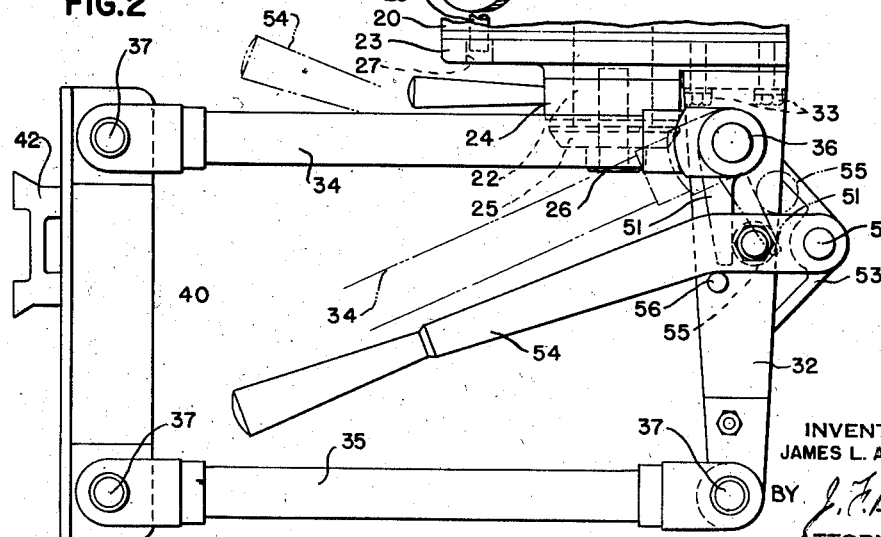
Fig. 2 is an enlarged side elevation of the torch-supporting linkage shown in Fig. 1, without the torch holders or wheel.

With the parts in the full-line positions shown in Fig. 2, the handle 54 has moved the center of the abutment 55 slightly beyond a normal from the axis of the countershaft 52 to the bearing surface of crank 51, and the parts will, therefore, stay in the position shown after the operator lets go of the handle. A stop 56 may be provided for preventing the handle 54 from moving down further than the position shown in Fig. 2. When this handle is raised into the dotted-line position, the abutment 55 causes the crank 51 and the link 34 to assume the positions shown in dotted lines.

The abutment 55 serves as a cam, and the crank 51 as the cam-follower. When this abutment is beyond the normal from the axis of shaft 52 to the bearing surface of crank 51, the follower is past the high point of the displacement of the cam.

Figs. 3 and 4 show a modified form of the invention, with a bracket 58 connected to a vertically extending post 59 by a split clamp 60 at the back of the bracket. The post 59 is a part of a self-propelled torch carriage 61. A rod 62 extends through the bracket 58 and is slidable lengthwise in the bracket. There are rack teeth 63 in the front side of the rod 62 and the sliding movement of this rod in the bracket 58 is effected by a pinion 64, journaled in the bracket 58, meshing with the rack teeth of the rod 62, and rotated by a knob 65. A key 66 prevents the rod 62 from turning in the bracket 58.

Split blocks 68 are clamped to opposite ends of the shaft 62 and keyed to the shaft so that they are always in the same angular relation to each other. Rearward links 69 of the parallelogram frames are integrally connected with the respective blocks 68 at opposite ends of the shaft 62.

Upper links 70 and lower links 71 have yokes at their rearward ends for connection with the rearward links 69. The connections are by pivot pins 72, each of which has a peripheral groove 73 into which a screw 74 extends to prevent endwise displacement. These screws thread through the ends of the rearward links 69. The links 70, 71 have similar connections with forward links 75. The forward links 75 are connected together by a tie rod 76 that has reduced ends extending through the forward links 75 and fastened to the links by nuts 77. A similar tie rod 76 connects the rearward links 69 together.

A bar 78 has rack teeth cut in its front face. This bar is secured to the forward links 75 by clamping brackets 79. A wheel-connecting bracket 80 is movable lengthwise along the bar 78 and has a key 81 that extends into a keyway in the bar 78 for preventing angular movement of the bracket 80 and the rack bar 78. A screw 82 threads through the bracket 80 and into contact with the front of the key 81 for thrusting the key against the bottom of the keyway to control the friction between the bracket 80 and the rack bar 78.

The bracket 80 is moved along the rack bar 78 by turning a knob 83 that rotates a pinion journaled in the bracket 80 and meshing with the rack teeth of the bar 78. The screw 82 is adjusted to obtain sufficient friction to make the bracket 80 remain in any position along the bar at which it may be set. A caster wheel 85 is attached to the bracket 80 by a post 86. The upper end of the post 86 is secured to the bracket 80 by a nut 87. The caster wheel 85 is held to the post by a set screw 88 threading through one side of the post, and into a peripheral groove in the spindle at the upper end of the caster.

Torch holders are clamped to the bar 78, either at the ends of the bar or intermediate its ends. In place of the round bar 78 the parallelogram frames of Figs. 3 and 4 may be connected with a transverse slide support 42, such as shown in Figs. 1 and 2.

The modified construction shown in Fig. 5 differs from that of Figs. 1 and 2 in that the handle for deflecting the parallelogram frames moves about a vertical instead of a horizontal axis. A hand lever 90 is supported by a vertical pivot 91 on a bracket 92 to which the rearward link 32 of the parallelogram frame is connected. An arm 93 extends up from the shaft 36 and is rigidly connected to the shaft 36. A roller 94 at one end of the hand lever 90 beyond the fulcrum pivot 91 contacts with the arm 93 to cause the shaft 36 to turn and the parallelogram frame to move up and down. The positions of the parts when the parallelogram frame is in lowered position are shown in dotted lines.

The preferred and some modifications of the invention have been described, but other embodiments with changes and modifications of the invention can be made. Some features of the invention can be used without others. Terms of orientation are, of course, relative.

I claim:

1. A floating support for one or more cutting torches including a folding parallelogram frame disposed with the axes of its joints substantially horizontal, bracket means for connecting one end of the frame with a cutting machine, a hand-operated lever angularly movable about an axis parallel to the axes of the joints of the parallelogram frame, a cam and a cam-follower, the cam being connected to the lever and the cam follower being a crank rigidly connected with a link of the folding parallelogram frame, said cam and cam-follower cooperating, upon angular movement of the lever, to move the frame and shift the torches toward or from the work, and said cam and cam-follower moving beyond dead center when the torch approaches raised position, for holding the torch in raised position.

2. A torch supporting apparatus comprising a bracket for connection with a cutting machine, a folding parallelogram frame connected at one end to the bracket and disposed with the axis of its joints substantially horizontal, means for connecting a torch with the other end of said frame, a manually-operated lever supported for movement about a substantially vertical axis, motion-transmitting connections through which horizontal angular movement of the lever produces vertical angular movement of one of the links of the folding parallelogram frame to raise or lower the torch, a portion of the motion-transmitting connections traveling beyond dead center during raising of the torch.

JAMES L. ANDERSON.